(12) United States Patent
Pototzky

(10) Patent No.: US 12,283,086 B2
(45) Date of Patent: Apr. 22, 2025

(54) METHOD AND DEVICE FOR ASCERTAINING OBJECT DETECTIONS OF AN IMAGE

(71) Applicant: Robert Bosch GmbH, Stuttgart (DE)

(72) Inventor: Daniel Pototzky, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 425 days.

(21) Appl. No.: 17/821,162

(22) Filed: Aug. 19, 2022

(65) Prior Publication Data

US 2023/0056387 A1 Feb. 23, 2023

(30) Foreign Application Priority Data

Aug. 23, 2021 (DE) .................... 10 2021 209 212.8

(51) Int. Cl.
*G06V 10/762* (2022.01)
(52) U.S. Cl.
CPC ........ *G06V 10/7635* (2022.01); *G06V 10/763* (2022.01)
(58) Field of Classification Search
None
See application file for complete search history.

(56) References Cited

U.S. PATENT DOCUMENTS

| 10,311,368 | B2 * | 6/2019 | Lokare | G06N 20/00 |
| 2015/0282766 | A1 * | 10/2015 | Cole | A61B 5/1123 |
| | | | | 702/139 |
| 2018/0040011 | A1 * | 2/2018 | Milton | H04W 4/029 |
| 2018/0203106 | A1 * | 7/2018 | Di | G01S 13/87 |
| 2019/0258878 | A1 * | 8/2019 | Koivisto | G06V 10/46 |
| 2019/0346559 | A1 * | 11/2019 | Eljarat | G01S 7/411 |
| 2020/0218979 | A1 * | 7/2020 | Kwon | G06F 18/2155 |
| 2020/0311100 | A1 * | 10/2020 | Rupela | G06F 18/213 |
| 2021/0116540 | A1 * | 4/2021 | Santra | G06V 40/23 |
| 2021/0272304 | A1 * | 9/2021 | Yang | G06V 10/454 |
| 2022/0138966 | A1 * | 5/2022 | Sung | G06T 7/246 |
| | | | | 382/103 |
| 2022/0179081 | A1 * | 6/2022 | Jeong | G06F 18/22 |

(Continued)

OTHER PUBLICATIONS

Ahmed et al., "Density Based Clustering for 3D Object Detection in Point Clouds", CVPR 2020, Computer Vision Foundation (Year: 2020).*

(Continued)

*Primary Examiner* — Randolph I Chu
(74) *Attorney, Agent, or Firm* — NORTON ROSE FULBRIGHT US LLP; Gerard A. Messina

(57) ABSTRACT

A computer-implemented method for ascertaining an output signal, which characterizes an object detection of an object of an image. The method includes: ascertaining a plurality of object detections with respect to the image; ascertaining a graph based on the plurality of object detections, object detections of the plurality of object detections being characterized by nodes of the graph and overlaps between two object detections each being characterized by edges of the graph; ascertaining a cluster of the graph based on the nodes and on the edges of the graph with the aid of a density-based clustering method; ascertaining an object detection based on the cluster and providing the object detection in the output signal.

14 Claims, 9 Drawing Sheets

(56) References Cited

U.S. PATENT DOCUMENTS

Figure 1:
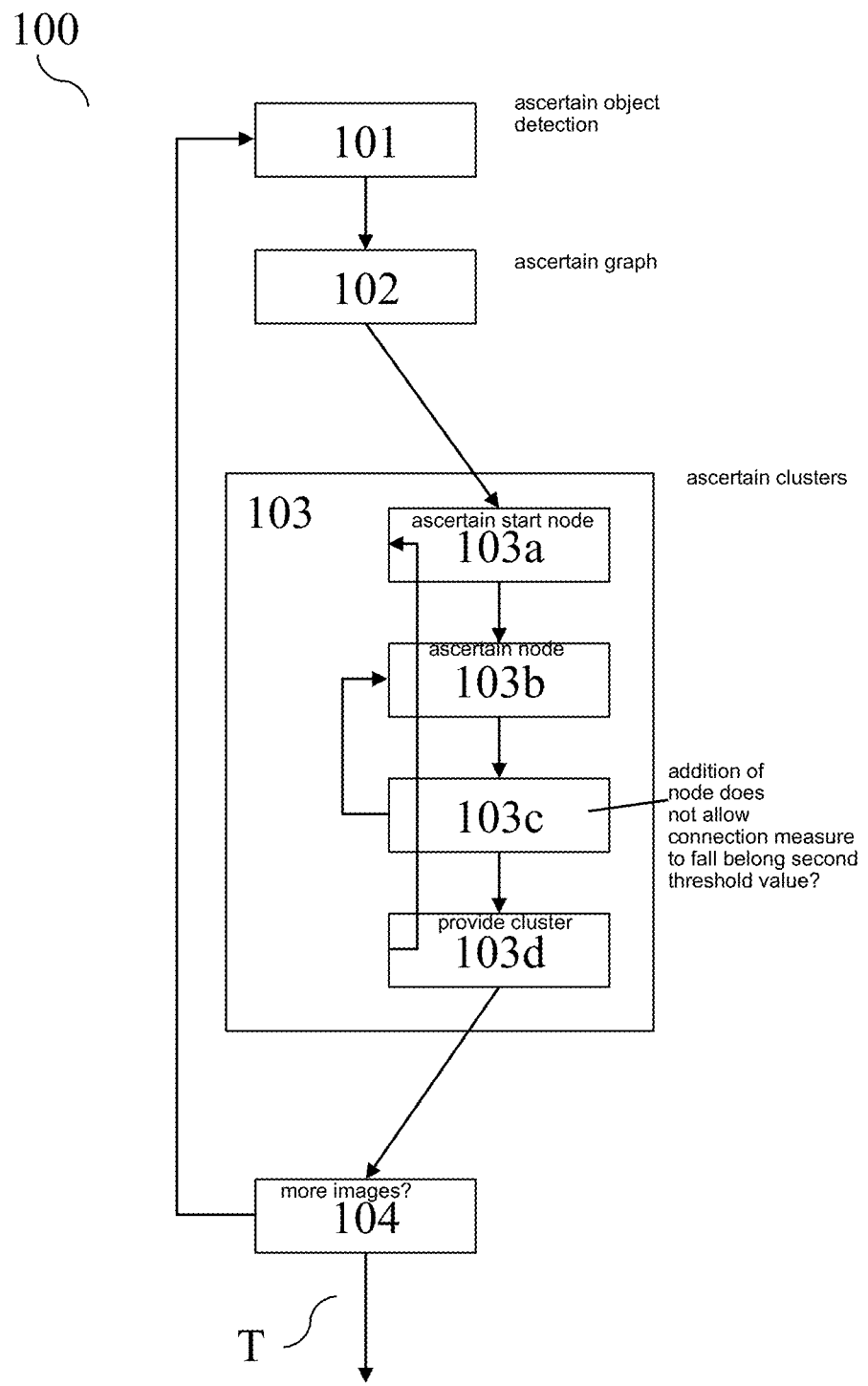

| | | | |
|---|---|---|---|
| 2023/0056387 A1* | 2/2023 | Pototzky | G06V 10/763 |
| 2023/0283925 A1* | 9/2023 | Northcutt | H03M 1/56 |
| | | | 348/302 |
| 2024/0185434 A1* | 6/2024 | Wyffels | G06V 20/58 |
| 2024/0310851 A1* | 9/2024 | Ebrahimi Afrouzi | |
| | | | A47L 9/2873 |
| 2024/0362197 A1* | 10/2024 | Thompson | G06V 30/413 |

OTHER PUBLICATIONS

Liu et al., "A Novel DBSCAN Clustering Algorithm via Edge Computing-Based Deep Neural Network Model for Targeted Poverty Alleviation Big Data", Hindawi, Wireless Communications and Mobile Computing vol. 2021, Article ID 5536579, 10 pages (Year: 2021).*

ArcGISPro "How Density-based Clustering works", https://web.archive.org/web/20201222164505/https://pro.arcgis.com/en/pro-app/latest/tool-reference/spatial-statistics/how-density-based-clustering-works.htm (Year: 2020).*

Radosavovic et al., "Data Distillation: Towards Omni-Supervised Learning," Computer Vision and Pattern Recognition (CVPR), 2018, pp. 4119-4128. <https://openaccess.thecvf.com/content_cvpr_2018/papers/Radosavovic_Data_Distillation_Towards_CVPR_2018_paper.pdf> Downloaded Aug. 15, 2022.

Cesa-Bianchi et al., "Fast and Optimal Algorithms for Weighed Graph Prediction," Stanford University, Snap (Stanford Large Network Dataset Collection), 2009, pp. 1-8.

Görke et al., "Experiments on Density-Constrained Graph Clustering," AMC Journal of Experimental Algorithmics, vol. 19, No. 1, Art. 6, 2014, pp. 1-31.

Tang et al., "PCL: Proposal Cluster Learning for Weakly Supervised Object Detection," IEEE Transactions on Pattern Analysis and Machine Intelligence, vol. 42, No. 1, 2020, pp. 176-191.

"Cluster Analysis," Wikipedia, 2021, pp. 1-14.

* cited by examiner

METHOD AND DEVICE FOR ASCERTAINING OBJECT DETECTIONS OF AN IMAGE

CROSS REFERENCE

The present application claims the benefit under 35 U.S.C. § 119 of German Patent Application No. DE 10 2021 209 212.8 filed on Aug. 23, 2021, which is expressly incorporated herein by reference it is entirety.

BACKGROUND INFORMATION

Radosavovic et al., "Data Distillation: Towards Omni-Supervised Learning," 2018, Conference on Computer Vision and Pattern Recognition (CVPR) describes a method for ascertaining object detections of an image.

Machine learning systems are increasingly used for detecting objects in images. The most efficient of these systems, i.e., those having the best detection performance, are typically trained to be supervised on the basis of annotated images (supervised learning). The training of these machine learning systems requires a large number of annotated images for training, since the performance of a machine learning system typically increases with the number of annotated images in the training.

Since the annotation of objects in images is a time-consuming and cost-intensive undertaking, training methods for the semi-supervised learning of machine learning systems are gaining increasingly in importance. In this type of training, the machine learning system is provided with both annotated as well as unannotated images.

In this case, it is desirable to form the annotations as exactly as possible.

SUMMARY

The present invention relates to a computer-implemented method for ascertaining an output signal, which characterizes an object detection of an object of an image. According to an example embodiment of the present invention, the method includes the following steps:
a. ascertaining a plurality of object detections with respect to the image;
b. ascertaining a graph based on the plurality of object detections, object detections of the plurality of object detections being characterized by nodes of the graph and overlaps between two object detections each being characterized by edges of the graph;
c. ascertaining a cluster of the graph based on the nodes and on the edges of the graph with the aid of a density-based clustering method;
d. ascertaining an object detection based on the cluster and providing the object detection in the output signal.

The ascertained output signal may be understood to be an annotation of the image, which characterizes one or multiple object detections. The image in this case may have been recorded, in particular, by an optical sensor, for example, by a camera sensor, a LIDAR sensor, a radar sensor, an ultrasonic sensor or a thermal camera.

The steps c. and d. of the method may, in particular, be carried out repeatedly, in order in this way to be able to provide multiple object detections in the output signal.

An object detection may be characterized, in particular, by a bounding box. The output signal may therefore include, in particular, one or multiple bounding boxes. It is possible, however, that object detections are in general characterized by cohesive regions, for example, by polygons.

According to an example embodiment of the present invention, to ascertain the plurality of object detections with respect to the image, it is possible to use, in particular, a previously trained object detector. For example, it is possible that the image is annotated as part of a semi-supervised training method and the plurality of object detections is ascertained by an object detector, which has been previously trained on previously annotated images. In general, an object detector may include, in particular, a neural network, the object detections being capable of being ascertained on the basis of an output of the neural network. It is also possible that the object detector is a neural network.

The object detector may, in particular, be configured to process the image and to predict a plurality of object detections. The object detector may preferably be designed in such a way that it ascertains for a respective bounding box a confidence value, which concerns a bounding box of an object of the image. The confidence value may, for example, be a percentage.

In preferred forms of the method of the present invention, it is possible that the plurality of object detections is ascertained based on a plurality of different pre-processings of the image.

According to an example embodiment of the present invention, the pre-processing of the image may, for example, be designed in such a way that the image is scaled according to various scales and/or that the image is mirrored (horizontal flip) and/or that the image is cropped at the edges. One or multiple of these types of pre-processing may be used to ascertain a pre-processed image. The plurality of object detections may then be made up, in particular, of object detections with respect to the image and object detections of the pre-processed image. A plurality of pre-processed images may preferably be ascertained by various applications or parameterizations of the types of pre-processing and the object detections with respect to this plurality of pre-processed images may be used as part of the plurality of object detections.

According to an example embodiment of the present invention, in order to be able to filter object detections with respect to the same objects, in particular, when using different pre-processed variants of the image, a density-based clustering analysis method is advantageously used in the method. The aim of this method may be understood to be that object detections, which adequately characterize similar positions and expansions of an object of the image, are combined. In the method provided, recourse is advantageously not made to a non-maximum suppression or to a bounding box voting for ascertaining clusters of object detections, rather a density-based clustering method is used. The inventors were able to find that the plurality of object detections thus ascertained is more exact in contrast to a method which resorts to one of the other methods.

According to an example embodiment of the present invention, in order to cluster the object detections, a graph, in particular, may be ascertained from the ascertained plurality of object detections. For this purpose, the object detections of the plurality of object detections may each be understood to be nodes of the graph, the nodes being connected via edges, whose weight characterizes in each case an overlap of nodes connected by the edge (and thus an overlap between object detections). The overlap used may, in particular, be a metric such as the intersection over union (IoU) between the nodes connected by the edge and thus between the object detections.

A node and an object detection characterized by the node may be understood below to be synonymous. A confidence ascertained by the object detector for an object detection may, in particular, be understood to be a confidence of the node.

If an overlap between two object detections is smaller than or equal to a predefinable threshold value, it may also be provided in the method that no edge exists in the graph between the two object detections. It is also possible that only those object detections are incorporated into the graph, whose confidence ascertained by the object detector exceeds a predefinable threshold value.

According to an example embodiment of the present invention, it is preferably possible that objects of different classes on the image are to be annotated with the aid of the method. In this case, it is possible that a separate graph is generated per class and the density-based clustering method is carried out for each graph thus ascertained. This may be understood in such a way that only those object detections of the plurality of object detections that belong to an identical class are taken into account for a graph.

The clustering method is preferably carried out based on a density measure of a cluster and based on a connection measure of the cluster.

An advantage of this approach is that the number of clusters, and thus the number of objects in the image, do not have to be known, but may be automatically ascertained by the method. This further improves the accuracy of the object detections of the output signal.

One result of an application of the clustering method may be one or multiple clusters. Each cluster includes preferably a plurality of object detections (for example, a plurality of bounding boxes). A cluster may include, in particular, a center of the cluster. A node may preferably characterize a center of the cluster. A node of the cluster preferably characterizes the center, whose confidence is greatest among the confidences of the nodes of the cluster. If the clustering method determines a cluster, the center may be provided as an object detection in the output signal. It is also possible that the nodes of a cluster may be weighted and merged according to their confidence. For example, the object detections of a cluster may each be characterized by a midpoint, as well as by a height and a width of a bounding box. The midpoint, the height, and the width may, in particular, be represented as a vector and the merge of the object detections may be carried out by a weighted addition of the vectors. The result of the addition may, in particular, be divided by the sum of the confidences of the nodes of the cluster in order to ascertain the object detection based on the cluster.

In further example embodiments of the method of the present invention, it is also possible that instead of the midpoint, another point of the bounding box is selected, for example, a corner of the bounding box.

The inventors were able to find, however, that it may be entirely appropriate to provide no object detections of such clusters as object detections in the output signal, which include only one single object detection. The exclusion of such centers results in an increase in the accuracy of the object detections of the output signal.

In one preferred embodiment of the method of the present invention for ascertaining the output signal, the density-based clustering method may include the following steps:

e. ascertaining a start node based on a sum of edge weights of the respective nodes in the graph and providing the start node as a node of the cluster;

f. ascertaining a node of the graph, whose connection to the cluster is the greatest, the node not being contained in the cluster;

g. adding the node to the cluster if an addition of the node does not allow a density measure of the cluster expanded by the node to fall below a predefinable first threshold value and if the addition does not allow a connection measure of the cluster expanded by the node to fall below a predefinable second threshold value;

h. otherwise providing the cluster.

To ascertain the start node, a sum of the edges, which are connected to the respective node, may be initially determined for each node in the graph. In this way, a reference number may be ascertained for each node, the node having the highest reference number being used as the start node. The start node may further be understood to be the center of a cluster, which may be expanded by further nodes in the following steps of the clustering method.

Subsequently, a node of the graph is ascertained, which has a numerically greatest connection to the cluster and is not already part of the cluster. A connection of a node to the cluster may, in particular, be understood in such a way that for the node, an edge is ascertained, which has the highest weight among all edges that connect the node to nodes of the cluster. The weight of this edge may subsequently be as the connection of the node to the cluster. Among the nodes not belonging to the cluster, a node may then be ascertained, which has a greatest connection, i.e., whose connection to the cluster is numerically the greatest.

If an addition of the node does not allow a density measure of the cluster expanded by the node to fall below a predefinable first threshold value, and if the addition does not allow a connection measure of the cluster expanded by the node to fall below a predefinable second threshold value, the node may be added to the cluster. This step may be understood in such a way that it is initially examined which influence an incorporation of the node into the cluster would have for an effect for the cluster. The density measure as well as the connection measure may be used as reference numbers for determining the effect.

The density measure may be understood in such a way that it characterizes whether an incorporation of the node ensures that all nodes of the cluster are still sufficiently connected to one another after the incorporation, the sufficient connection being checked with the aid of the first threshold value. The density measure may preferably be characterized by the formula $$d_Z = \frac{2 \cdot (W_Z + W_{Zk})}{n \cdot (n+1)}$$

$W_Z$ characterizing a sum of all weights of the edges between nodes of the cluster Z, $W_{Zk}$ being a sum of all weights of the edges from node to node of the cluster, and n being the number of nodes in the cluster, i.e., the number of nodes in the cluster prior to a potential incorporation of the node into the cluster.

The connection measure may be understood in such a way that it characterizes whether an incorporation of the node ensures that the node itself has a sufficient connection to the nodes of the cluster, the sufficient connection being checked with the aid of the second threshold value. The connection measure may be preferably characterized by the formula $$cp_Z = \frac{W_{Z_k}}{d_Z \cdot (n+1)}$$

In the method, it may preferably be provided that nodes may be iteratively ascertained in step f. and may be added to the cluster until at least one of the conditions from step g. is no longer met, the cluster being provided and the nodes of the cluster being removed from the graph if the at least one condition is no longer met.

This may be understood in such a way that clusters are gradually ascertained via a greedy algorithm. In each iteration, a new start node is initially selected, on the basis of which a cluster is subsequently formed by iterative addition of nodes. The steps e. through h. may, in particular, be iteratively repeated until the graph no longer contains any nodes. In contrast to the other methods, which are based, for example, on a non-maximum suppression, the inventors were able to find that the clusters thus obtained and, therefore, the object detections that are provided in the output signal, are more precise.

According to an example embodiment of the present invention, it may further be provided that the object detection ascertained based on the cluster is not provided in the output signal if the cluster is made up of only the start node. The inventors were able to establish that clusters that are made up of only one object detection are typically attributable to false-positive object detections of the object detector. An exclusion of clusters, which include only one node, namely, the start node, thus result in a further improvement of the results.

In general, it is possible that the graph includes all classes of object detections that are able to be recognized by the object detector. For example, the object detector may be designed to be able to recognize vehicles, pedestrians, bicyclists and traffic lights on images of surroundings of a vehicle. Preferably, however, it is also possible that the graph is ascertained with respect to one class of object detections. In other words, when ascertaining the graph, only the object detections that belong to an identical class may also be taken into account. Accordingly, in the example above, one graph for object detections of the class vehicles, one graph for object detections of the class pedestrians, one graph for object detections of the class bicyclists and one graph for object detections of the class traffic lights, respectively, may be ascertained in each case.

According to an example embodiment of the present invention, it may be provided, in particular, that the above-described method in one of the described forms is carried out for one class of objects each, which may be classified by the object detector, preferably for each of the classes of objects that are able to be classified by the object detector. The object detections for the different classes thus ascertained may then be provided in the output signal.

In one further aspect, the present invention relates to a computer-implemented method for training a machine learning system, including the following steps:
  i. ascertaining an output signal with respect to an image with the aid of one form of the method for ascertaining an output signal;
  j. training the machine learning system, the image being used as an input signal of the machine learning system and the ascertained output signal being used as the desired output signal.

The method for training may be used, in particular, as part of a semi-supervised training method. The machine learning system may, in particular, be the object detector, which ascertains the plurality of object detections. Based on the ascertained output signal, the machine learning system is then able to be further trained. The step is preferably carried out multiple times, in each case for different images. In this way, a data set of images, in particular, may be annotated, i.e., the images in the data set may be augmented with desired output signals, which are to be predicted by the machine learning system. The machine learning system may then be trained on images originally annotated for the training of the machine learning system as well as on images of the data set in combination with the ascertained output signals. A prediction accuracy of the machine learning system is improved by the self-supervised training.

It is further possible that with the aid of the method for ascertaining an output signal, a first output signal is ascertained for at least one image, a second machine learning system ascertains a second output signal, and it is subsequently examined to what extent the first output signal corresponds with the second output signal. In other words, the second machine learning system may be tested with the aid of the method for ascertaining an output signal. To assess the correspondence, established measures may be used, for example, a mean average precision.

DETAILED DESCRIPTION OF EXAMPLE EMBODIMENTS

Specific embodiments of the present invention are explained in greater detail below with reference to the figures.

FIG. 1 schematically shows the sequence of a method for ascertaining an annotation, according to an example embodiment of the present invention.

Figure 2:
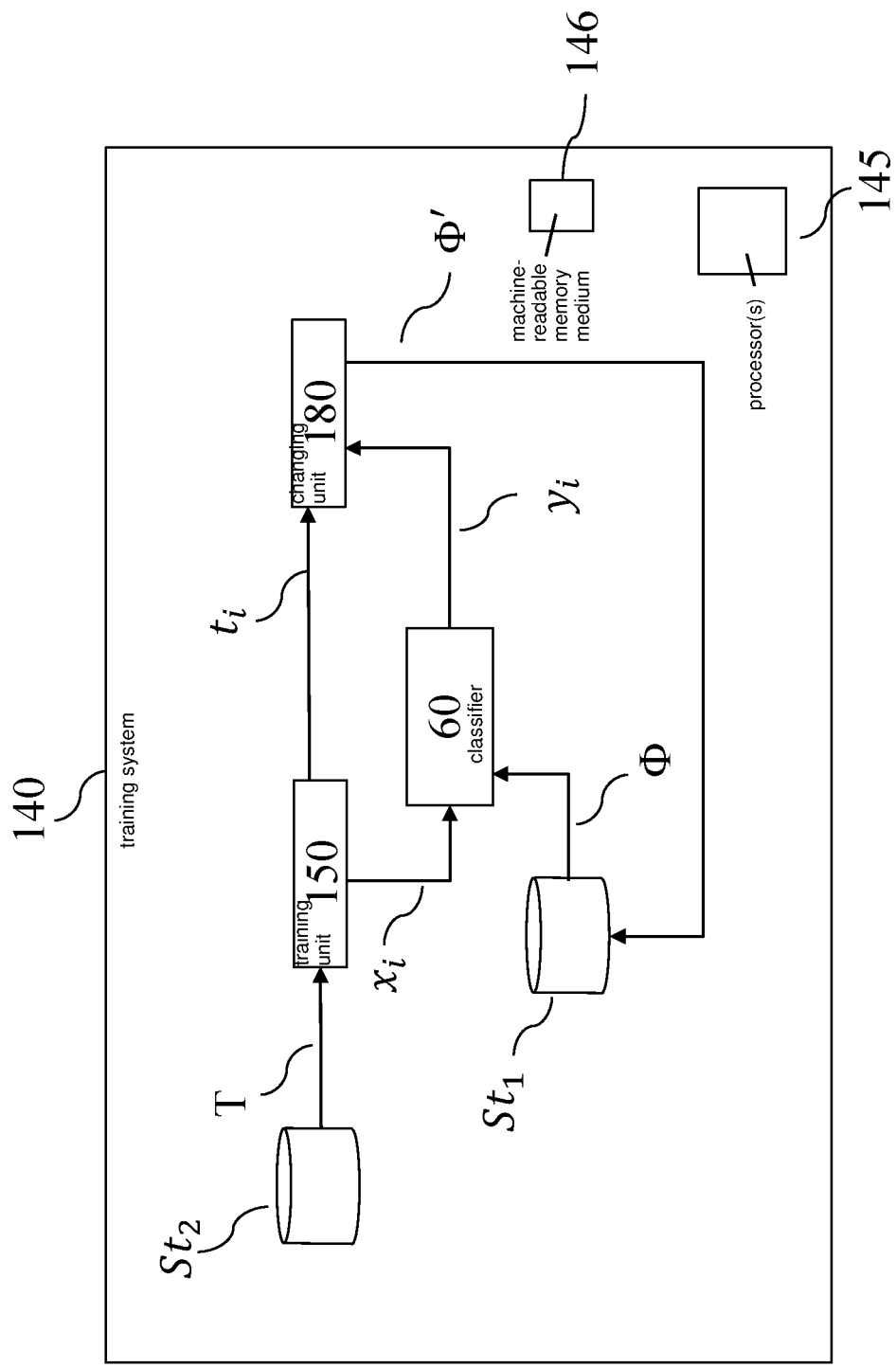

FIG. 2 schematically shows a training system for training a classifier, according to an example embodiment of the present invention.

Figure 3:
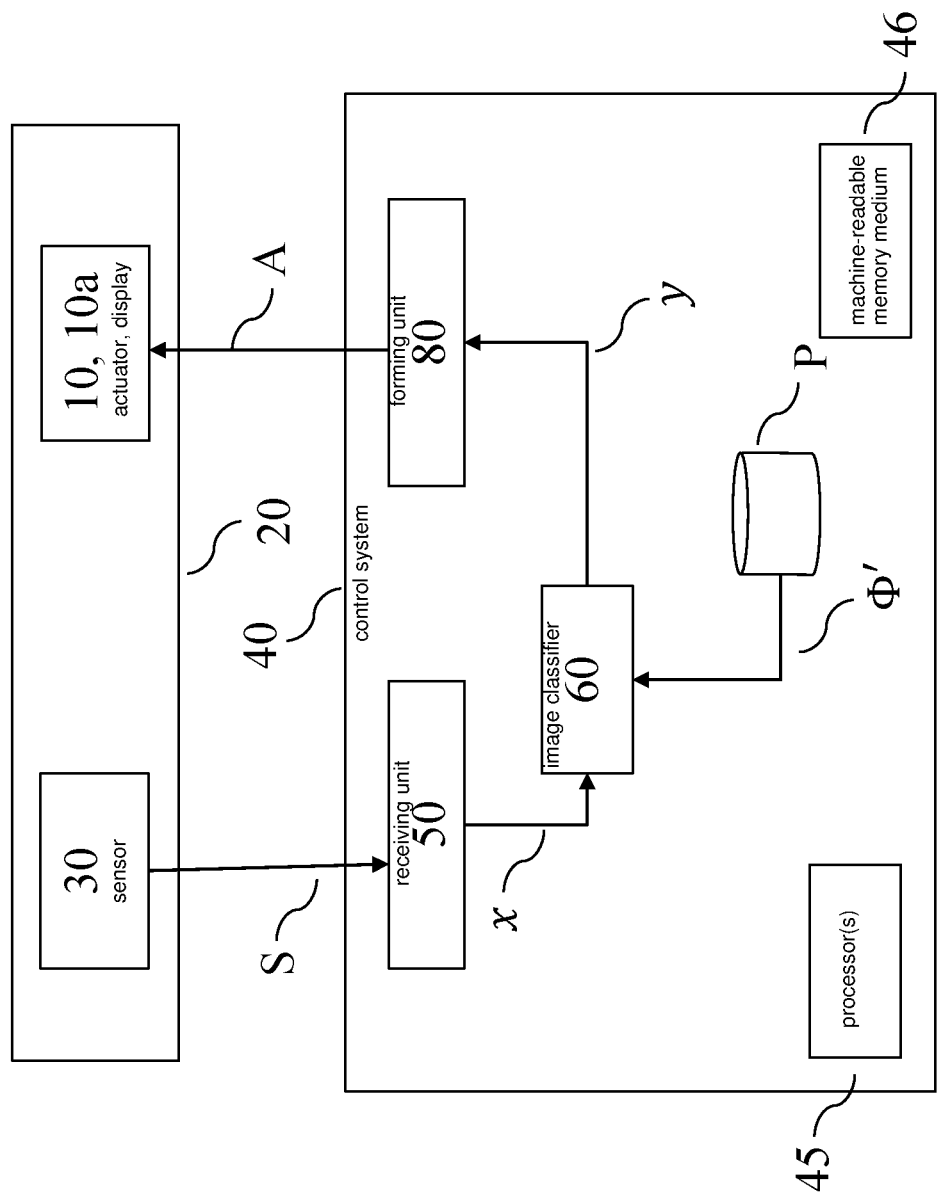

FIG. 3 schematically shows a structure of a control system for activating an actuator, according to an example embodiment of the present invention.

Figure 4:
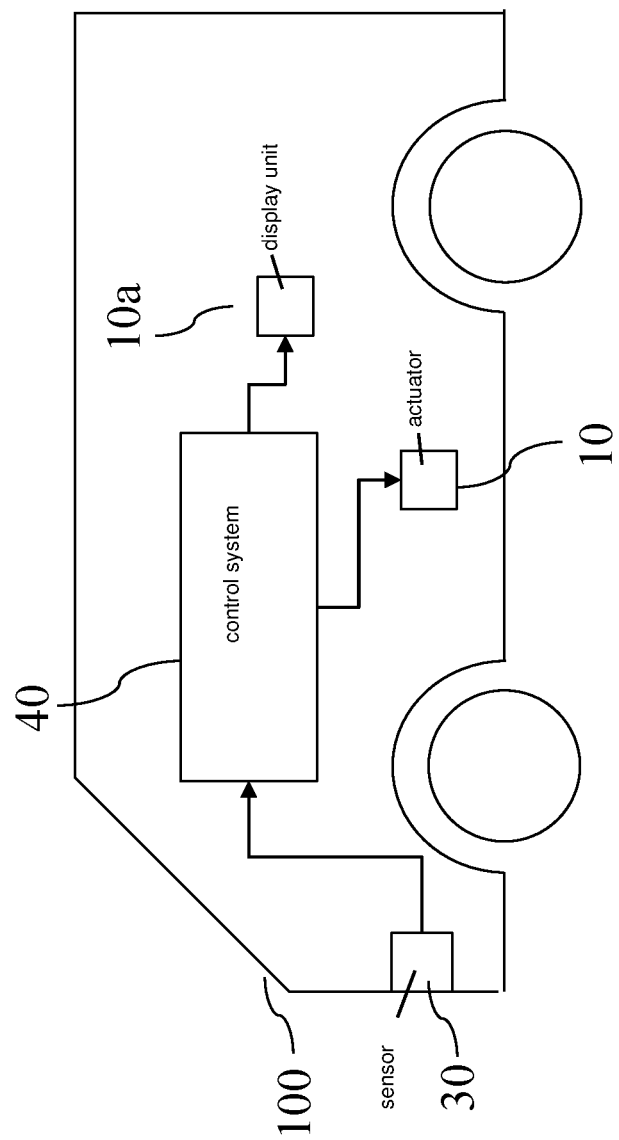

FIG. 4 schematically shows one exemplary embodiment for controlling an at least semi-autonomous robot, according to the present invention.

Figure 5:
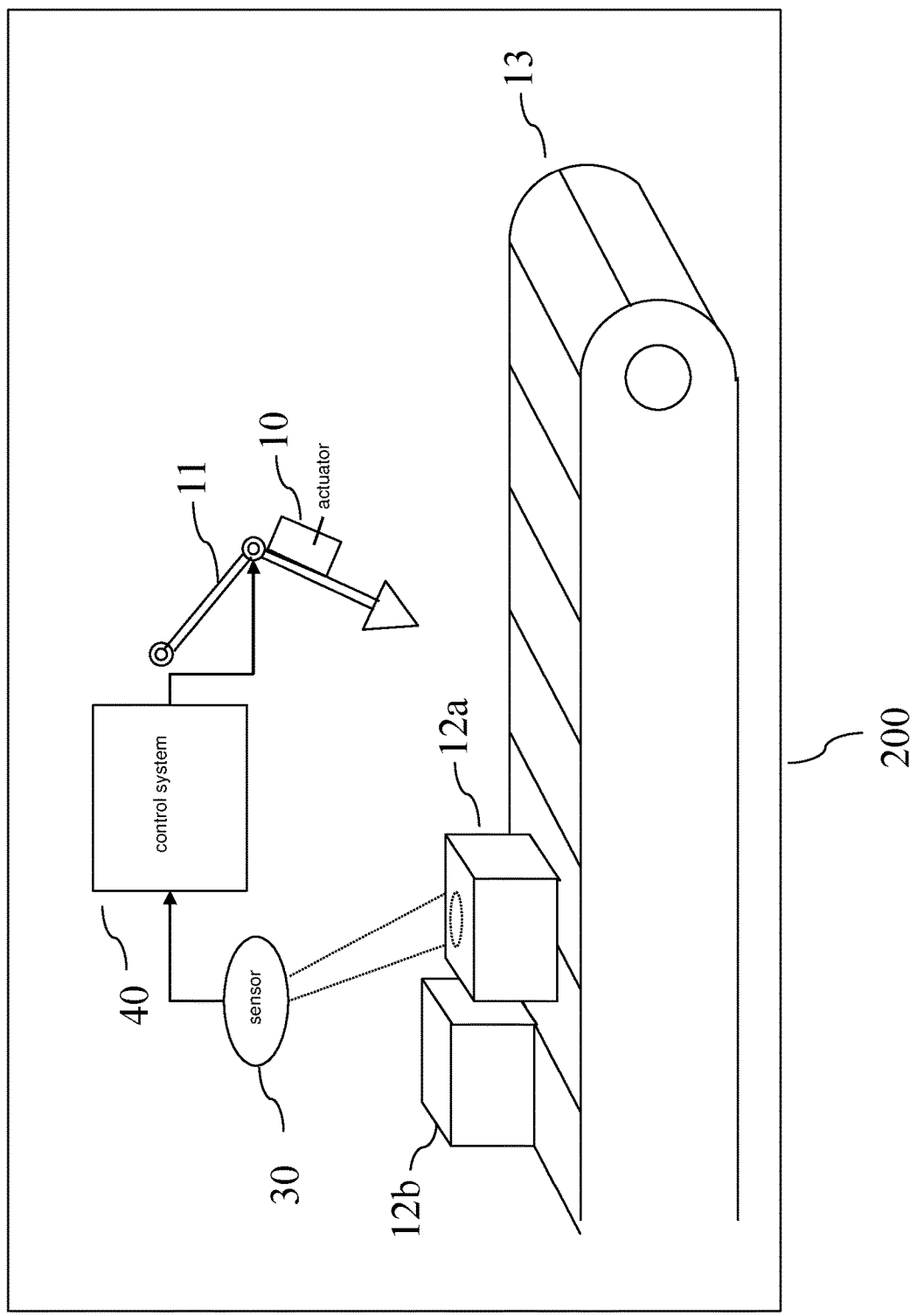

FIG. 5 schematically shows one exemplary embodiment for controlling a manufacturing system, according to the present invention.

Figure 6:
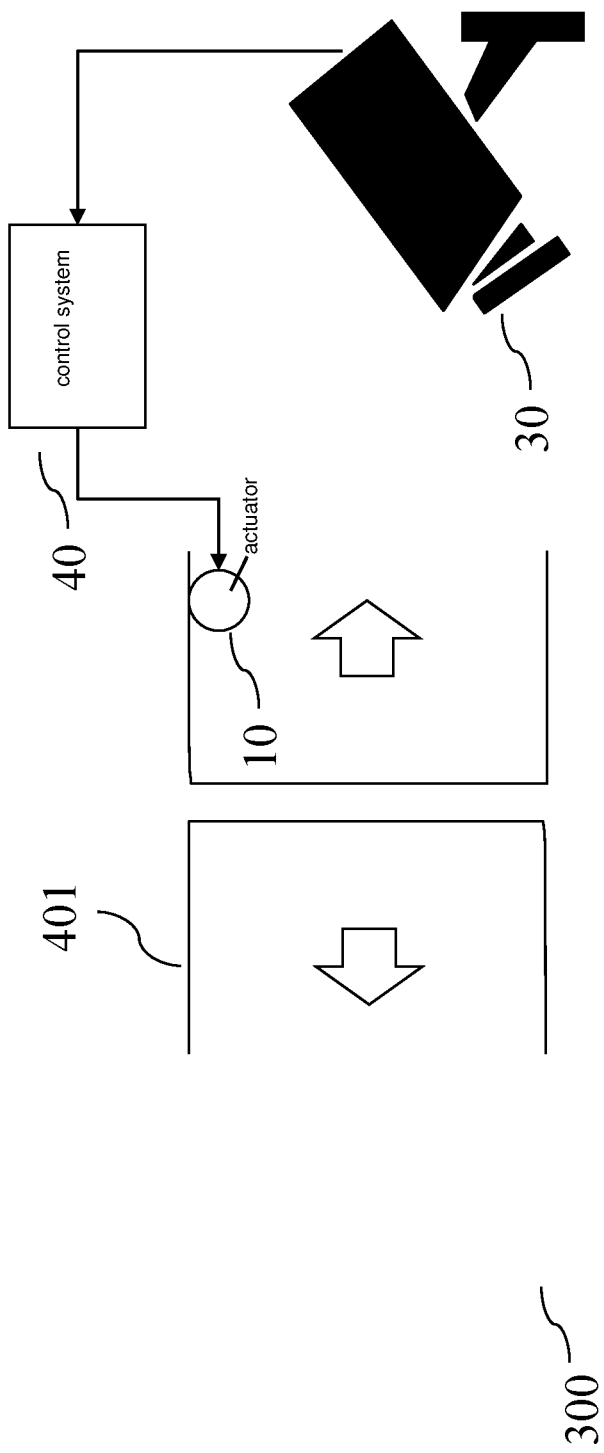

FIG. 6 schematically shows one exemplary embodiment for controlling an access system, according to the present invention.

Figure 7:
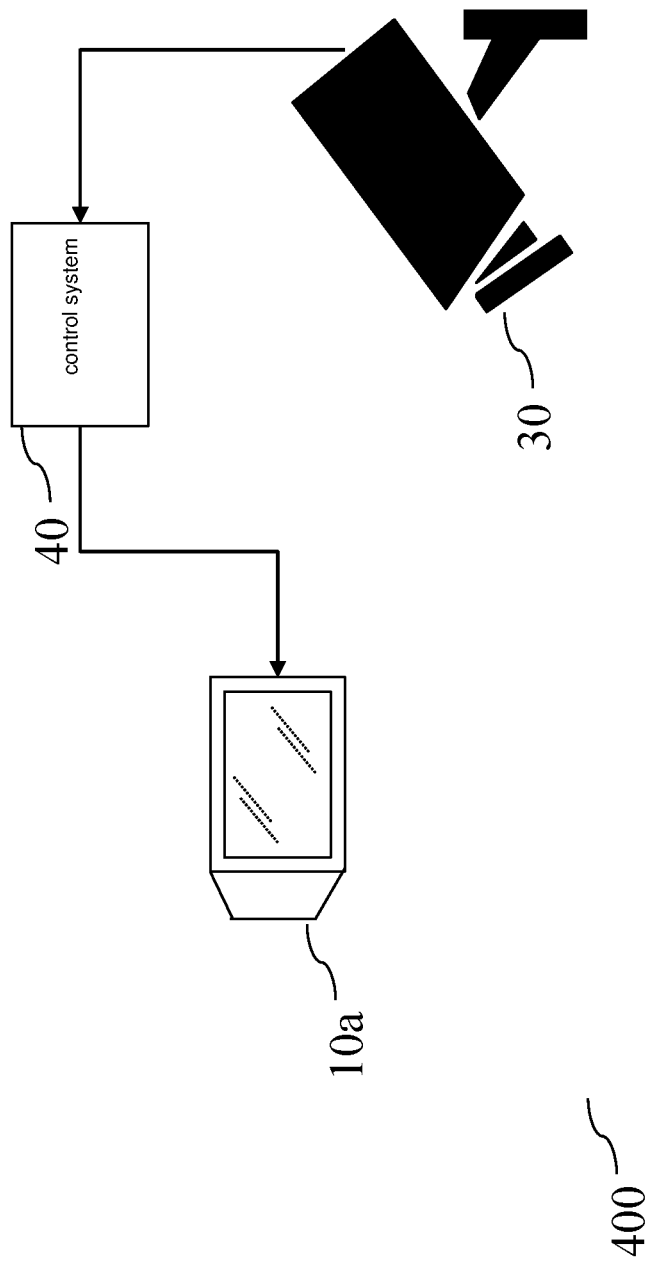

FIG. 7 schematically shows one exemplary embodiment for controlling a monitoring system, according to the present invention.

Figure 8:
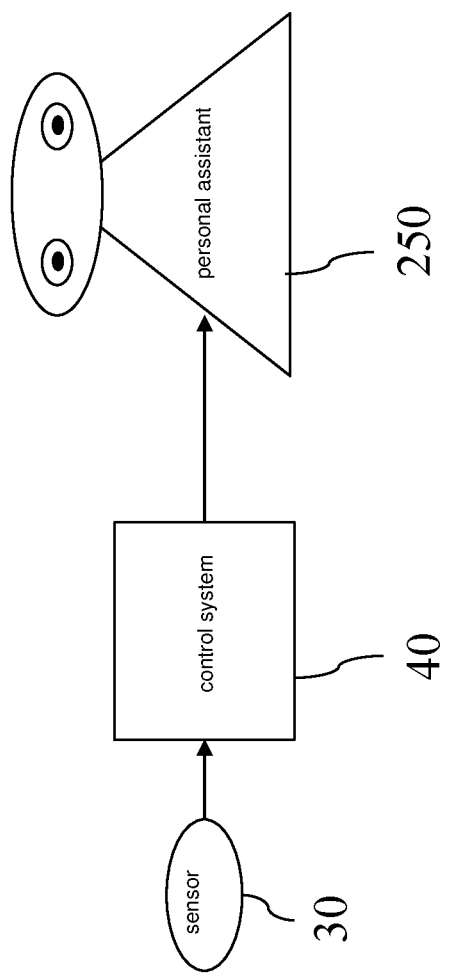
Figure 8:
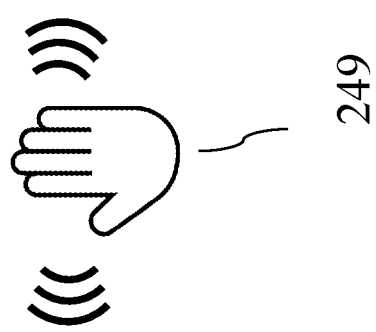

FIG. 8 schematically shows one exemplary embodiment for controlling a personal assistant, according to the present invention.

Figure 9:
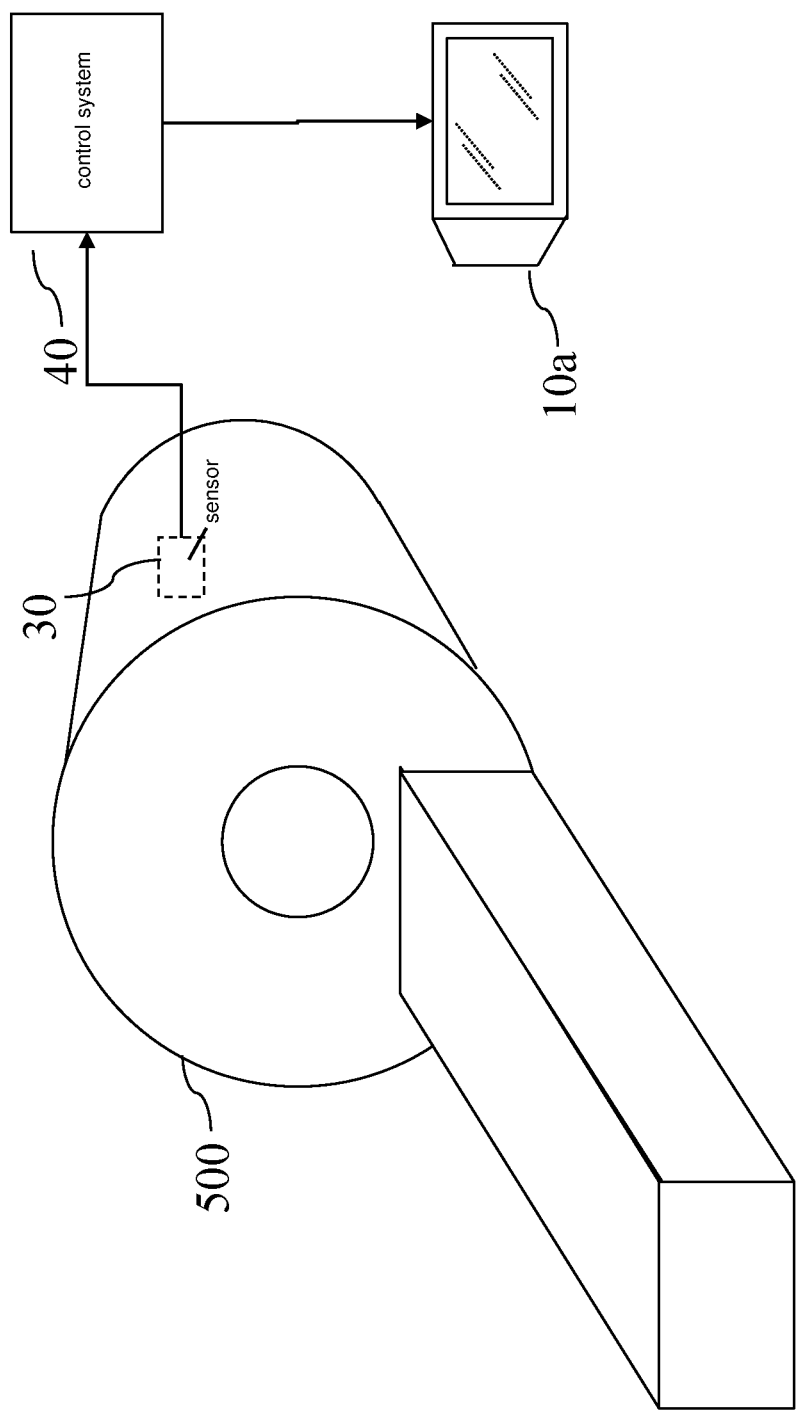

FIG. 9 schematically shows one exemplary embodiment for controlling a medical imaging system, according to the present invention.

DETAILED DESCRIPTION OF EXAMPLE EMBODIMENTS

FIG. 1 schematically shows the sequence of a method 100 for ascertaining annotations, the annotations being iteratively ascertained in the method with respect to a plurality of images and the annotations each characterizing object detections of objects of the images. The images and the ascertained annotations are preferably provided as a training data set T at the end of the method, for example, when all images or a desired number of images have been annotated.

In a first step 101, one object detection of a plurality of object detections with respect to an image is ascertained. For this purpose, an object detector, in particular, may be used, which is designed to ascertain for an image object detections of objects, which are mapped in the image. The object detector is further preferably designed to ascertain for each object detection a confidence, which characterizes how likely it is that a respective object detection characterizes an object of the image. The image is preferably processed with the aid of a pre-processing method and a pre-processed image is thus ascertained. The object detector is applied to the pre-processed image and the object detections thus ascertained are also incorporated into the plurality of object detections. If the pre-processing characterizes a reflection of the image, the object detections ascertained for the pre-processed image may preferably be mirrored again before they are incorporated into the plurality of object detections. With the aid of respectively different pre-processing methods and/or with the aid of different parameterizations of a pre-processing method, it is possible to preferably ascertain multiple pre-processed images, each of which are processed by the object detector and the resulting object detections are incorporated into the plurality of object detections.

In a second step 102 of method 100, a graph is ascertained based on the plurality of object detections, object detections of the plurality of object detections being characterized by nodes of the graph, and overlaps between two object detections each being characterized by edges of the graph. There is, therefore, a one-to-one relationship of one node each of the graph with one object detection each of the plurality of object detections. This one-to-one relationship may also be understood in such a way that one node each corresponds to one object detection each. It may preferably be provided that each node in the graph is connected by an edge to each other node in the graph. As a weight of an edge, a measure of the overlap of the object detections, in particular, may be used, whose corresponding nodes are connected by the edge. It may be preferably also provided that an edge is inserted in the graph only if its weight reaches or exceeds a predefined threshold value. It may also be provided that the graph is ascertained with respect to one class of object detections.

In a third step 103, clusters are ascertained based on the nodes and on the edges of the graph with the aid of a density-based clustering method. In one preferred specific embodiment, third step 103 includes a first sub-step 103*a*, in which a start node of the cluster is initially ascertained. To ascertain the start node, the following method may preferably be selected: a sum of the weights of the edges, which are connected to the nodes, is initially determined for each node in the graph. In this way, a reference number is ascertained for each node. The node for which the numerically largest reference number has been ascertained is then selected as the start node.

In a second sub-step 103*b* of third step 103, a node of the graph may then be ascertained, which is not already contained in the cluster and whose connection to the cluster is the greatest. A connection of a node to the cluster may, in particular, be understood in such a way that for the node, an edge is ascertained, which has the highest weight from among all edges, which connect the nodes to nodes of the cluster. The weight of this edge may subsequently be [sic] as the connection of the node to the cluster. Among the nodes not belonging to the cluster, a node may then be ascertained, which has the greatest connection, i.e., whose connection to the cluster is numerically the greatest.

In a third sub-step 103*c*, it may then be checked for the node ascertained in the second sub-step whether an addition of the node does not allow a density measure of the cluster expanded by the node to fall below a predefinable first threshold value. It may further be checked whether the addition does not allow a connection measure of the cluster expanded by the node to fall below a predefinable second threshold value. If both checks are affirmed, the node may be added to the cluster. Third sub-step 103*c* may be understood in such a way that it is initially examined which influence an incorporation of the node into the cluster would have for an effect on the cluster. The density measure as well as the connection measure may be used as reference numbers for determining the effect.

The density measure may be understood in such a way that it characterizes whether an incorporation of the node ensures that all nodes of the cluster after incorporation are still sufficiently connected to one another, the sufficient connection being checked with the aid of the first threshold value. The density measure may preferably be characterized by the following formula:

$$d_Z = \frac{2 \cdot (W_Z + W_{Zk})}{n \cdot (n+1)}$$

$W_Z$ characterizing a sum of all weights of the edges between nodes of cluster Z, $W_{Zk}$ being a sum of all weights of the edges from node to node of the cluster, and n being the number of nodes in the cluster, i.e., the number of nodes in the cluster prior to a potential incorporation of the nodes into the cluster.

The connection measure may be understood in such a way that it characterizes whether an incorporation of the node ensures that the node itself has a sufficient connection to the nodes of the cluster, the sufficient connection being checked with the aid of the second threshold value. The connection measure may preferably be characterized by the formula $$cp_Z = \frac{W_{Zk}}{d_Z \cdot (n+1)}$$

If the node has been incorporated into the cluster, a return to second sub-step 103*b* in the method may be preferably made and a new node of the graph may be ascertained, for which, in turn, as described above, it may be checked whether or not it is to be incorporated into the cluster.

This loop of method 100 generated by the return may be carried out until a node is ascertained, which is not incorporated into the cluster or further nodes are no longer present in the graph, which are not already contained in the cluster. In this case, all nodes contained in the cluster may be removed from the graph in a fourth sub-step 103*d* and the cluster may be provided. If nodes are still present in the graph, a return may be preferably made to the first sub-step and a new cluster may be ascertained. If the graph is empty, third step 103 may be ended.

Based on the clusters ascertained in third step 103, an object detection may be ascertained for one cluster each in a fourth step 104. For this purpose, the object detection corresponding to the nodes of the cluster may be merged. This may preferably occur via a weighted sum of representations of the object detections. A representation may, for example, be a vectorial representation of the object detection. For example, a midpoint as well as a height and a width may be represented via a vector, the vector being a representation of an object detection box. The merging may then occur with the aid of a weighted sum of the vectors. For example, the vectors may be weighted according to a confidence of the object detections to which each vector corresponds. The result of the sum may be preferably divided by the sum of the confidences in order to ascertain the object detection for the cluster.

For the clusters ascertained in third step 103, one or multiple object detections may thus be ascertained. If there are images still to be annotated, first step 101 may be continued again after fourth step 104, a not yet annotated image being capable of being used. If all images or a desired number of images have/has been annotated, the images and their associated annotations may be provided as training data set T.

FIG. 2 shows one exemplary embodiment of a training system 140 for training classifier 60 of control system 40 with the aid of training data set T. Training data set T includes a plurality of input signals $x_i$, which are used for training classifier 60, training data set T further including for one input signal $x_i$ each a desired output signal $t_i$, which corresponds to input signal $x_i$ and characterizes a classification of input signal $x_i$.

For training, a training data unit 150 accesses a computer-implemented database $St_2$, data base $St_2$ providing training data set T. Training data unit 150 ascertains from training data set T preferably randomly at least one input signal $x_i$ and desired output signal $t_i$ corresponding to input signal $x_i$ and conveys input signal $x_i$ to classifier 60. Classifier 60 ascertains an output signal $y_i$ on the basis of input signal $x_i$.

Desired output signal $t_i$ and ascertained output signal $y_i$ are conveyed to a changing unit 180.

Based on desired output signal $t_i$ and ascertained output signal $y_i$, new parameters $\Phi'$ for classifier 60 are then determined by changing unit 180. For this purpose, changing unit 180 compares desired output signal $t_i$ and ascertained output signal $y_i$ with the aid of a loss function. The loss function ascertains a first loss value, which characterizes how far ascertained output signal $y_i$ deviates from desired output signal $t_i$. A negative log-likelihood function is selected in the exemplary embodiment as the loss function. In alternative exemplary embodiments, other loss functions are also possible.

It is further possible that ascertained output signal $y_i$ and desired output signal $t_i$ each include a plurality of sub-signals, for example, in the form of tensors, in each case one sub-signal of desired output signal $t_i$ corresponding to a sub-signal of ascertained output signal $y_i$. For example, it is possible that classifier 60 is designed for object detection and a first sub-signal characterizing in each case a probability of occurrence of an object with respect to a part of input signal $x_i$ and a second sub-signal characterizes the exact position of the object. In the event that ascertained output signal $y_i$ and desired output signal $t_i$ include a plurality of corresponding sub-signals, a second loss value is ascertained preferably for respectively corresponding sub-signals with the aid of a suitable loss function, and the ascertained second loss values are suitably merged with the first loss value, for example, via a weighted sum.

Changing unit 180 ascertains new parameters $\Phi'$ on the basis of the first loss value. In the exemplary embodiment, this occurs with the aid of a gradient descent method, preferably stochastic gradient descent, Adam, or AdamW. In further exemplary embodiments, the training may also be based on an evolutionary algorithm or on a second order optimization.

Ascertained new parameters $\Phi'$ are stored in a model parameter memory $St_1$. Ascertained new parameters $\Phi'$ are provided preferably as parameters $\Phi$ to classifier 60.

In further preferred exemplary embodiments, the described training is iteratively repeated for a predefined number of iteration steps, or iteratively repeated until the first loss value falls below a predefined threshold value. Alternatively or in addition, it is also possible that the training is terminated if an average first loss value with respect to a test data set or validation data set falls below a predefined threshold value. In at least one of the iterations, new parameters $\Phi'$ determined in a previous iteration are used as parameters $\Phi$ of classifier 60.

In addition, training system 140 may include at least one processor 145 and at least one machine-readable memory medium 146, which contains commands which, when they are executed by processor 145, prompt training system 140 to carry out a training method according to one of the aspects of the present invention.

FIG. 3 shows a control system 40 for controlling an actuator 10 in its surroundings 20 based on an output signal y of classifier 60. Surroundings 20 are detected, preferably at regular temporal intervals, in a sensor 30, in particular in an imaging sensor such as a camera sensor, which may also be provided by a plurality of sensors, for example, a stereo camera. Sensor signal S—or, in the case of multiple sensors one sensor signal S each—of sensor 30 is conveyed to control system 40. Thus, control system 40 receives a sequence of sensor signals S. Control system 40 ascertains therefrom activation signals A, which are transferred to actuator 10.

Control system 40 receives the sequence of sensor signals S of sensor 30 in an optional receiving unit 50, which converts the sequence of sensor signals S into a sequence of input signals x (alternatively, each sensor signal S may also be directly adopted as input signal x). Input signal x may, for example, be a portion or a further processing of sensor signal S. In other words, input signal x is ascertained as a function of sensor signal S. The sequence of input signals x is fed to a classifier 60.

Classifier 60 is preferably parameterized by parameters $\Phi$, which are stored in a parameter memory P and are provided by the latter.

Classifier 60 ascertains output signals y from input signals x. Output signals y are fed to an optional forming unit 80, which ascertains activation signals A therefrom, which are fed to actuator 10 in order to activate actuator 10 accordingly.

Actuator 10 receives activation signals A, is activated accordingly and carries out an action. Actuator 10 in this case may include a (not necessarily structurally integrated) activation logic, which ascertains a second activation signal from activation signal A, with which actuator 10 is activated.

In further specific embodiments, control system 40 includes sensor 30. In still further specific embodiments, control system 40 alternatively or additionally also includes actuator 10.

In further preferred specific embodiments, control system 40 includes at least one processor 45 and at least one machine-readable memory medium 46, on which instructions are stored which, when they are carried out on the at least one processor 45, prompt control system 40 to carry out the method according to the present invention.

In alternatively specific embodiments, a display unit 10a is provided alternatively or in addition to actuator 10.

FIG. 4 shows how control system 40 may be used for controlling an at least semi-autonomous robot, here an at least semi-autonomous motor vehicle 100.

Sensor 30 may, for example, be a video sensor situated preferably in motor vehicle 100. Input signals x in this case may be understood to be input images and classifier 60 to be an image classifier.

Image classifier 60 is configured to identify objects recognizable on input images x.

Actuator 10 situated preferably in motor vehicle 100 may, for example, be a brake, a drive, or a steering of motor vehicle 100. Activation signal A may then be ascertained in such a way that actuator or actuators 10 is/are activated in such a way that motor vehicle 100, for example, prevents a collision with the objects identified by image classifier 60, in particular, if objects of particular classes, for example, pedestrians, are involved.

Alternatively or in addition, display unit 10a may be activated with activation signal A and, for example, the identified objects are displayed. It is also possible that display unit 10a is activated with activation signal A in such a way that it outputs an optical or acoustic warning signal if it is ascertained that motor vehicle 100 threatens to collide with one of the identified objects. The warning with the aid of a warning signal may also take place with the aid of a haptic warning signal, for example, via a vibration of a steering wheel of motor vehicle 100.

The at least semi-autonomous robot may alternatively also be another mobile robot (not depicted), for example, one which moves by flying, floating, diving or pacing. The mobile robot may, for example, also be an at least semi-autonomous lawn mower or an at least semi-autonomous cleaning robot. In these cases as well, activation signal A may be ascertained in such a way that the drive and/or the steering of the mobile robot is/are activated in such a way that the at least one semi-autonomous robot, for example, prevents a collision with objects identified by image classifier 60.

FIG. 5 shows one exemplary embodiment, in which control system 40 is used for activating a manufacturing machine 11 of a manufacturing system 200 by activating an actuator 10 controlling manufacturing machine 11. Manufacturing machine 11 may, for example, be a machine for punching, sawing, drilling and/or cutting. It is further possible that manufacturing machine 11 is designed to grip a manufactured product 12a, 12b with the aid of a gripper.

Sensor 30 may then, for example, be a video sensor, which detects, for example, the conveyor surface of a conveyor belt 13, it being possible for manufactured products 12a, 12b to be situated on conveyor belt 13. Input signals x in this case are input images x and classifier 60 is an image classifier. Image classifier 60 may be configured, for example, to ascertain a position of manufactured products 12a, 12b on the conveyor belt.

Actuator 10 controlling manufacturing machine 11 may then be activated as a function of the ascertained positions of manufactured products 12a, 12b. For example, actuator 10 may be activated in such a way that it punches, saws, drills and/or cuts a manufactured product 12a, 12b at a predefined point of manufactured product 12a, 12b.

It is further possible that image classifier 60 is designed to ascertain alternatively or in addition to the position, further characteristics of a manufactured product 12a, 12b. It is possible, in particular, that image classifier 60 ascertains whether a manufactured product 12a, 12b is defective and/or damaged. In this case, actuator 10 may be activated in such a way that manufacturing machine 11 rejects a defective and/or damaged manufactured product 12a, 12b.

FIG. 6 shows one exemplary embodiment, in which control system 40 is used for controlling an access system 300. Access system 300 may include a physical access control, for example, a door 401. Sensor 30 may be, in particular, a video sensor or thermal imaging sensor, which is configured to detect an area in front of door 401. Classifier 60 may therefore be understood to be an image classifier. With the aid of image classifier 60, it is possible to interpret a detected image. Image classifier 60 is able, in particular to detect persons in an input image x conveyed to the former. If multiple persons have been detected simultaneously, it is possible, for example, to reliably ascertain the identity of the persons by an assignment of the persons (i.e., the objects) relative to one another, for example, by an analysis of their movements.

Actuator 10 may be a lock, which releases or does not release the access control, for example, opens or does not open door 401, as a function of activation signal A. For this purpose, activation signal A may be selected as a function of output signal y ascertained for input image x with the aid of image classifier 60. For example, it is possible that output signal y includes pieces of information, which characterize the identity of a person detected by image classifier 60, and activation signal A is selected based on the identity of the person.

A logical access control instead of the physical access control may also be provided.

FIG. 7 shows one exemplary embodiment, in which control system 40 is used for controlling a monitoring system 400. This exemplary embodiment differs from the exemplary embodiment represented in FIG. 4 in that instead of actuator 10, display unit 10a is provided, which is activated by control system 40. For example, sensor 30 may record an input image x, in which at least one person is apparent, and the position of the at least one person is detected with the aid of image classifier 60. Input image x may then be displayed on display unit 10a, the detected persons being capable of being color highlighted.

FIG. 8 shows one exemplary embodiment, in which control system 40 is used for controlling a personal assistant 250. Sensor 30 is preferably an optical sensor, which receives images of a gesture of a user 249, for example, a video sensor or an infrared camera. Classifier 60 in this case is an image classifier.

Control system 40 ascertains as a function of the signals of sensor 30 an activation signal A of personal assistant 250, for example, by image classifier 60 carrying out a gesture recognition. This ascertained activation signal A is then conveyed to personal assistant 250 and the latter is thus activated accordingly. Ascertained activation signal A may be selected, in particular, in such a way that it corresponds to a presumed desired activation by user 249. This presumed desired activation may be ascertained as a function of the gesture recognized by image classifier 60. Control system 40 may then select activation signal A as a function of the presumed desired activation for conveyance to personal assistant 250 and/or may select activation signal A for conveyance to the personal assistant in accordance with presumed desired activation 250.

This corresponding activation may, for example, include personal assistant 250 retrieving pieces of information from a database and playing them back in a comprehensible manner for user 249.

Instead of personal assistant 250, a household appliance (not depicted), in particular, a washing machine, a stove, an oven, a microwave or a dishwasher, may also be provided in order to be activated accordingly.

FIG. 9 shows one exemplary embodiment, in which control system 40 is used for controlling a medical imaging system 500, for example, an MRT device, an X-ray device or an ultrasound device. Sensor 30 may, for example, be provided by an imaging sensor. Classifier 60 may therefore be understood to be an image classifier. Display unit 10a is activated by control system 40.

Sensor 30 is configured to ascertain an image of a patient, for example, an X-ray image, an MRT image or an ultrasound image. At least a portion of the image is conveyed as input image x to image classifier 60. Image classifier 60 may, for example, be configured to classify different types of a tissue apparent on input image x, for example, via a semantic segmentation.

Activation signal A may then be selected in such a way that the ascertained types of tissue are displayed color highlighted on display unit 10a.

In further exemplary embodiments (not shown), imaging system 500 may also be used for non-medical purposes, for example, to ascertain material characteristics of a workpiece. For this purpose, imaging system 500 may record an image of a workpiece. Image classifier 60 in this case may be configured in such a way that it receives at least a portion of the image as input image x and classifies it with respect to the material characteristics of the workpiece. This may occur, for example, via a semantic segmentation of input image x. The classification thus ascertained may, for example, be displayed together with the input image on display device 10a.

The term "computer" includes arbitrary devices for processing predefinable calculation rules. These calculation rules may be present in the form of software, or in the form of hardware, or also in a mixed form of software and hardware.

In general, a plurality may be understood to be indexed, i.e., each element of the plurality is assigned a unique index, preferably by assigning consecutive integers to the elements contained in the plurality. If a plurality includes N elements, N being the number of elements in the plurality, the elements are preferably assigned the integers from 1 through N.

What is claimed is:

1. A computer-implemented method for ascertaining an output signal, which characterizes an object detection of an object of an image, the method comprising the following steps:
   a. ascertaining a plurality of object detections with respect to the image;
   b. ascertaining a graph based on the plurality of object detections, object detections of the plurality of object detections being characterized by nodes of the graph and overlaps between two object detections each being characterized by edges of the graph;
   c. ascertaining a cluster of the graph based on the nodes and on the edges of the graph using a density-based clustering method;
   d. ascertaining an object detection based on the cluster and providing the object detection in the output signal.

2. The method as recited in claim 1, wherein the clustering method is carried out based on a density measure of the cluster and based on a connection measure of the cluster.

3. The method as recited in claim 2, wherein the clustering method includes the following steps:
   e. ascertaining a start node based on a sum of edge weights of the respective nodes in the graph and providing the start node as a node of the cluster;
   f. ascertaining a node of the graph, whose connection to the cluster is greatest, the node not being contained in the cluster;
   g. adding the node to the cluster when an addition of the node does not allow a density measure of the cluster expanded by the node to fall below a predefinable first threshold value and when the addition does not allow a connection measure of the cluster expanded by the node to fall below a predefinable second threshold value;
   h. providing the cluster as ascertained cluster.

4. The method as recited in claim 3, wherein nodes in step f. are iteratively ascertained and added to the cluster until at least one of the conditions from step g. is no longer met, the cluster being provided and the nodes of the cluster being removed from the graph when the at least one condition is no longer met.

5. The method as recited in claim 4, wherein the steps e. through h. are iteratively repeated until the graph no longer contains any nodes.

6. The method as recited in claim 4, wherein the object detection ascertained based on the cluster is not provided in the output signal when the cluster is made up of only the start node.

7. The method as recited in claim 1, wherein the plurality of object detections is ascertained based on a plurality of different pre-processings of the image.

8. The method as recited in claim 1, wherein the graph is ascertained with respect to a class of object detections.

9. A computer-implemented method for training a machine learning system, comprising the following steps:
   ascertaining an output signal with respect to an image by:
      a. ascertaining a plurality of object detections with respect to the image,
      b. ascertaining a graph based on the plurality of object detections, object detections of the plurality of object detections being characterized by nodes of the graph and overlaps between two object detections each being characterized by edges of the graph,
      c. ascertaining a cluster of the graph based on the nodes and on the edges of the graph using a density-based clustering method,
      d. ascertaining an object detection based on the cluster and providing the object detection in the output signal;
   training the machine learning system, the image being used as an input signal of the machine learning system and the ascertained output signal being used as the desired output signal.

10. The method as recited in claim 9, wherein one output signal each is ascertained for a plurality of images using steps a-d, and the machine learning system is trained based on the plurality of images and on the respectively ascertained output signals.

11. The method as recited in claim 2, wherein the density measure is characterized by the following formula $$d_Z = \frac{2 \cdot (W_Z + W_{Zk})}{n \cdot (n+1)}.$$

12. The method as recited in claim 2, wherein the connection measure is characterized by the formula $$cp_Z = \frac{W_{Zk}}{d_Z \cdot (n+1)}.$$

13. A training device configured to train a machine learning system, the training device configured to:
ascertain an output signal with respect to an image by:
   a. ascertaining a plurality of object detections with respect to the image,
   b. ascertaining a graph based on the plurality of object detections, object detections of the plurality of object detections being characterized by nodes of the graph and overlaps between two object detections each being characterized by edges of the graph,
   c. ascertaining a cluster of the graph based on the nodes and on the edges of the graph using a density-based clustering method,
   d. ascertaining an object detection based on the cluster and providing the object detection in the output signal;
train the machine learning system, the image being used as an input signal of the machine learning system and the ascertained output signal being used as the desired output signal.

14. A non-transitory machine-readable memory medium on which is stored a computer program for ascertaining an output signal, which characterizes an object detection of an object of an image, the method comprising the following steps:
   a. ascertaining a plurality of object detections with respect to the image;
   b. ascertaining a graph based on the plurality of object detections, object detections of the plurality of object detections being characterized by nodes of the graph and overlaps between two object detections each being characterized by edges of the graph;
   c. ascertaining a cluster of the graph based on the nodes and on the edges of the graph using a density-based clustering method;
   d. ascertaining an object detection based on the cluster and providing the object detection in the output signal.

\* \* \* \* \*